(12) United States Patent
Garg

(10) Patent No.: US 11,429,984 B2
(45) Date of Patent: Aug. 30, 2022

(54) ON-LINE ADVERTISEMENT

(75) Inventor: Neeraj Garg, Milton, CA (US)

(73) Assignee: BlackBerry Limited, Waterloo (CA)

( * ) Notice: Subject to any disclaimer, the term of this patent is extended or adjusted under 35 U.S.C. 154(b) by 334 days.

(21) Appl. No.: 12/773,256

(22) Filed: May 4, 2010

(65) Prior Publication Data
US 2011/0276399 A1    Nov. 10, 2011

(51) Int. Cl.
*G06Q 30/02* (2012.01)

(52) U.S. Cl.
CPC ......... *G06Q 30/02* (2013.01); *G06Q 30/0241* (2013.01); *G06Q 30/0257* (2013.01)

(58) Field of Classification Search
CPC ..... G06Q 30/0207–0277; G06Q 30/02; G06Q 10/109; G06Q 20/32; G06Q 30/0272; G06Q 10/1097; G06Q 30/0251; G06Q 30/0267; G06Q 30/0241; G06Q 30/0257; G06F 12/0811; G06F 9/45558; G06F 12/0817; G06F 12/1009; G06F 12/1027; G06F 9/30036; G06F 9/30145; H04L 67/12; H04L 67/18; H04L 12/2818; H04L 67/04; H04L 67/06; H04L 67/02; H04L 67/22; H04L 67/306; H04L 67/327; H04W 76/27; H04W 72/042

See application file for complete search history.

(56) References Cited

U.S. PATENT DOCUMENTS

| | | | |
|---|---|---|---|
| 6,760,916 B2 * | 7/2004 | Holtz et al. | 725/34 |
| 6,912,398 B1 * | 6/2005 | Domnitz | 455/461 |
| 2002/0083443 A1 * | 6/2002 | Eldering et al. | 725/34 |
| 2002/0087401 A1 | 7/2002 | Leapman et al. | |
| 2003/0220835 A1 * | 11/2003 | Barnes, Jr. | G06F 40/134 379/93.12 |
| 2004/0039638 A1 | 2/2004 | Moriyama | |
| 2004/0210587 A1 * | 10/2004 | Reysa | G06Q 10/107 |
| 2005/0227679 A1 | 10/2005 | Papulov | |
| 2008/0148320 A1 * | 6/2008 | Howcroft | H04N 5/44513 725/61 |
| 2009/0271261 A1 | 10/2009 | Mehta | |

FOREIGN PATENT DOCUMENTS

| | | |
|---|---|---|
| CN | 1482789 | 3/2004 |
| CN | 1482789 A | 3/2004 |
| EP | 1043905 | 10/2000 |
| EP | 1220552 A1 | 3/2002 |
| EP | 1220552 | 7/2002 |

OTHER PUBLICATIONS

First Office Action dated Dec. 4, 2012, in corresponding Chinese patent application No. 201110097642.4.
(Continued)

*Primary Examiner* — Chinyere Mpamugo
(74) *Attorney, Agent, or Firm* — Conley Rose, P. C.; J. Robert Brown, Jr.

(57) ABSTRACT

Displaying, on a mobile communication device, an opportunity to receive selection of a displayed ad. Receiving selection of a displayed ad. Determining at least one re-serve condition for the selected ad. Making the selected ad available for re-serve. Upon occurrence of a determined re-serve condition, displaying the selected ad on the device.

12 Claims, 6 Drawing Sheets

(56) References Cited

OTHER PUBLICATIONS

Office Action dated Aug. 14, 2013, in corresponding Canadian patent application No. 2,735,539.
Second Office Action dated Aug. 5, 2013, in corresponding Chinese patent application No. 201110097642.4.
English translation of the Second Office Action dated Aug. 5, 2013, in corresponding Chinese patent application No. 201110097642.4.
Office Action dated Jul. 31, 2014; in corresponding Canadian patent application No. 2,735,539.
The Fourth Office Action dated Aug. 29, 2014; in corresponding Chinese patent application No. 201110097642.4.
English translation of the Fourth Office Action dated Aug. 29, 2014; in corresponding Chinese patent application No. 201110097642.4.
Third Office Action dated Feb. 24, 2014, in corresponding Chinese patent application No. 201110097642.4.
English translation of the Third Office Action dated Feb. 24, 2014, in corresponding Chinese patent application No. 201110097642.4.
English translation of the First Office Action dated Dec. 4, 2012, in corresponding Chinese patent application No. 201110097642.4.
The First Office Action dated Dec. 4, 2012, in corresponding Chinese patent application No. 201110097642.4.
Extended European Search report dated Sep. 16, 2010. In corresponding application No. 10161916.1.
Manfred., AgendiZe introduces new features. http://www.eadp.org/index.php?q=taxonomy/term/3&from=30. Published on Apr. 2, 2009 and retrieved on Jan. 24, 2012.
Examination Report dated Feb. 24, 2011. In corresponidng application No. 10161916.1.
Canadian Office Action dated Sep. 27, 2017, received for Canadian patent application No. 2735539.
EPO Form 2906 Brief Communication Regarding Oral Proceedings dated May 18, 2018 for European Patent Application No. 10161916.1.
Summons to attend oral proceedings pursuant to Rule 115(1) EPC, EP No. 10161916, dated Dec. 18, 2017.
Brief Communication regarding Oral Proceedings issued on May 18, 2018 for European Application No. 1061916.1.
Canadian Office Action dated Oct. 3, 2016, received for Canadian Application No. 2,735,539.
Extended European Search Report dated Sep. 26, 2018 for European Patent Application No. 18191326.0.
Examiner's Report dated Sep. 4, 2018, received for Canadian Patent Application No. 2,735,539.
Chinese Office Action dated Apr. 27, 2015, received for Chinese Application No. 201110097642.4.
Canadian Office Action dated Sep. 2, 2015, received for Canadian Application No. 2,735,539.
Examiner's Report dated Aug. 2, 2019, received for Canadian Patent Application No. 2,735,539.
European Decision to Refuse; Application No. 10161916.1; dated Jun. 19, 2018; 20 pages.
European Examination Report; Application No. 18191326.0; dated Oct. 1, 2020; 7 pages.
Canadian Office Action; Application No. 2,735,539; dated Mar. 22, 2021; 4 pages.

* cited by examiner

ON-LINE ADVERTISEMENT

FIELD OF THE TECHNOLOGY

The technology disclosed herein (the "technology") relates to on-line advertising. The technology has specific application in deferring advertisement presentation based on properties of an offer made in the advertisement. Exemplary embodiments are presented in the context of a mobile communications device.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

Figure 1:
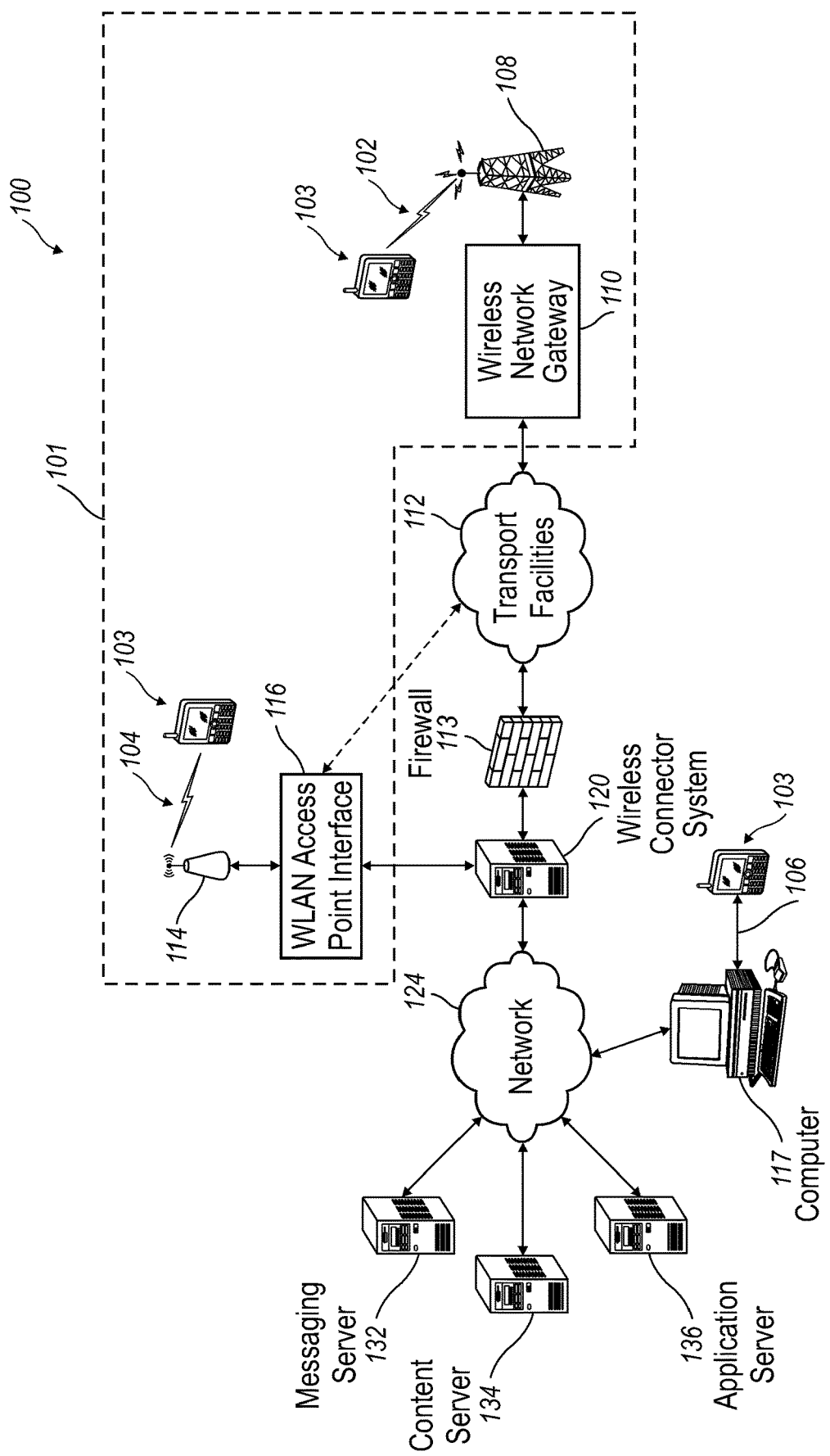
FIG. 1 illustrates a communication system including a mobile communication device to which example embodiments of the technology can be applied.

In order to facilitate an understanding of environments in which example embodiments described herein can operate reference is made to FIG. 1 that shows, in block diagram form, a communication system 100 in which embodiments of the technology can be applied. The communication system 100 may comprise a number of mobile communication devices 103 that may be connected to the remainder of system 100 in any of several different ways. Accordingly, several instances of mobile communication devices 103 are depicted in FIG. 1 employing different example ways of connecting to system 100.

These figures are exemplary only, and those persons skilled in the art will appreciate that additional elements and modifications may be necessary to make the communication device, e.g., 103 work in particular network environments. While in the illustrated embodiments, the communication devices, e.g., 103 may comprise smart phones, in other embodiments, however, the communication devices may comprise personal digital assistants (PDA), tablet computers, laptop computers, desktop computers, servers, or other communication devices capable of sending and receiving electronic messages.

Mobile communication devices 103 are connected to a wireless network 101 that may comprise one or more of a Wireless Wide Area Network (WWAN) 102 and a Wireless Local Area Network (WLAN) 104 or other suitable network arrangements. In some embodiments, the mobile communication devices 103 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communication devices 103. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet) and its resources, or the wireless connector system 120 may be operated by a mobile network provider. In some embodiments, the network 124 may be realized using the Internet rather than or in addition to an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communication devices 103, and intranet file services.

The wireless connector system 120 typically provides a secure exchange of data (e.g., email messages, personal information manager (PIM) data, and IM data) with the mobile communication devices 103. In some embodiments, communications between the wireless connector system 120 and the mobile communication devices 103 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

Online advertising can use the Internet and World Wide Web to deliver marketing messages to potential customers, e.g., via mobile devices 103. Examples of online advertising include contextual ads on search engine results pages, banner ads, rich media Ads, social network advertising, interstitial ads, online classified advertising, advertising networks and e-mail marketing, including e-mail spam. A floating advertisement ("ad") is an ad that moves across the device screen or floats above the content displayed on the screen. An expanding changes size and may alter the contents of the webpage. A polite ad can be downloaded in smaller pieces to minimize the disruption of the content being viewed. A wallpaper ad can change the background of the page being viewed. Pop-up ads appear in a window that opens in front of the current window, displaying an advertisement, or entire webpage. Pop-under ads are similar to a pop-up except that the window is loaded or sent behind the current window so that the window is not displayed as the active window. Video ads are similar to a banner ad, except that instead of a static or animated image, video clips are displayed. This is the kind of advertising most prominent in television, and advertisers will use the same content for both television and online advertising. In map ads, ads appear in or over, a location on an electronic map such as on Google Maps™ mapping service. An interstitial ad can be a full-page ad that appears before a browser loads an original destination. Mobile ads can be an SMS text or multimedia message sent to a cell phone, or any of the other type of ads.

Marketing on mobile communications devices has been enabled, in part, by SMS (Short Message Service). The IAB (Interactive Advertising Bureau), and the Mobile Marketing Association as well, have established guidelines and are evangelizing the use of the mobile channel for marketers. One criterion for provisioning an SMS ad campaign is that the consumer opts in to the service. Mobile system operators may demand a double opt in from the consumer and the ability for the consumer to opt out of the service at any time by sending the word STOP via SMS. These guidelines are established in the MMA Consumer Best Practices Guidelines which are followed by some mobile marketers in the United States.

MMS mobile marketing can contain a timed slideshow of images, text, audio and video. This mobile content is delivered via MMS (Multimedia Message Service). Nearly all new communication devices produced with a color screen are capable of sending and receiving standard MMS message. Brands are able to both send (mobile terminated) and receive (mobile originated) rich content through MMS A2P (application-to-person) mobile networks to mobile subscribers. In some networks, brands are also able to sponsor messages that are sent P2P (person-to-person). Some advertisers deliver ads within mobile games or sponsoring entire games to drive consumer engagement, e.g., This is known as mobile advergaming or ad-funded mobile game, e.g., Orbitz® travel services on-line games.

Mobile marketing may also take advantage of short-range technologies, such as Bluetooth® technologies and infrared to present location-based advertisements. More broadly location-based services (LBS) can be offered on mobile communications device networks as a way to send custom advertising and other information to subscribers based on their current location. The provider can obtain device location from a GPS chip built into the device, or using radio-location and trilateration based on the signal-strength of the closest cell-phone towers. Further mobile WiMAX technology can be utilized to give a location-specific ad content to a communications device. Mobile marketing can be between a BS (Base Station) and a multitude of CPE (Consumer Premise Equipment) mounted on vehicle dashtops. Whenever vehicles come within the effective range of the BS, the dashtop CPE with LCD touchscreen loads up a set of icons or banners of individually different shapes that can be activated by finger touches or voice tags. On the screen, a frame of five (5) to seven (7) icons or banners is offered to choose from, and the frame rotates one after another.

Mobile marketing differs from most other forms of marketing communication in that it can be more likely user-initiated (mobile originated, or MO) message, and can require the consent of the consumer to receive future communications. A call delivered from a server (business) to a user (consumer) is called a mobile terminated (MT) message. Due to the demands for more user controlled media, mobile messaging infrastructure providers have responded by developing architectures that offer applications to operators with more freedom for the users, as opposed to the network-controlled media.

Figure 2:
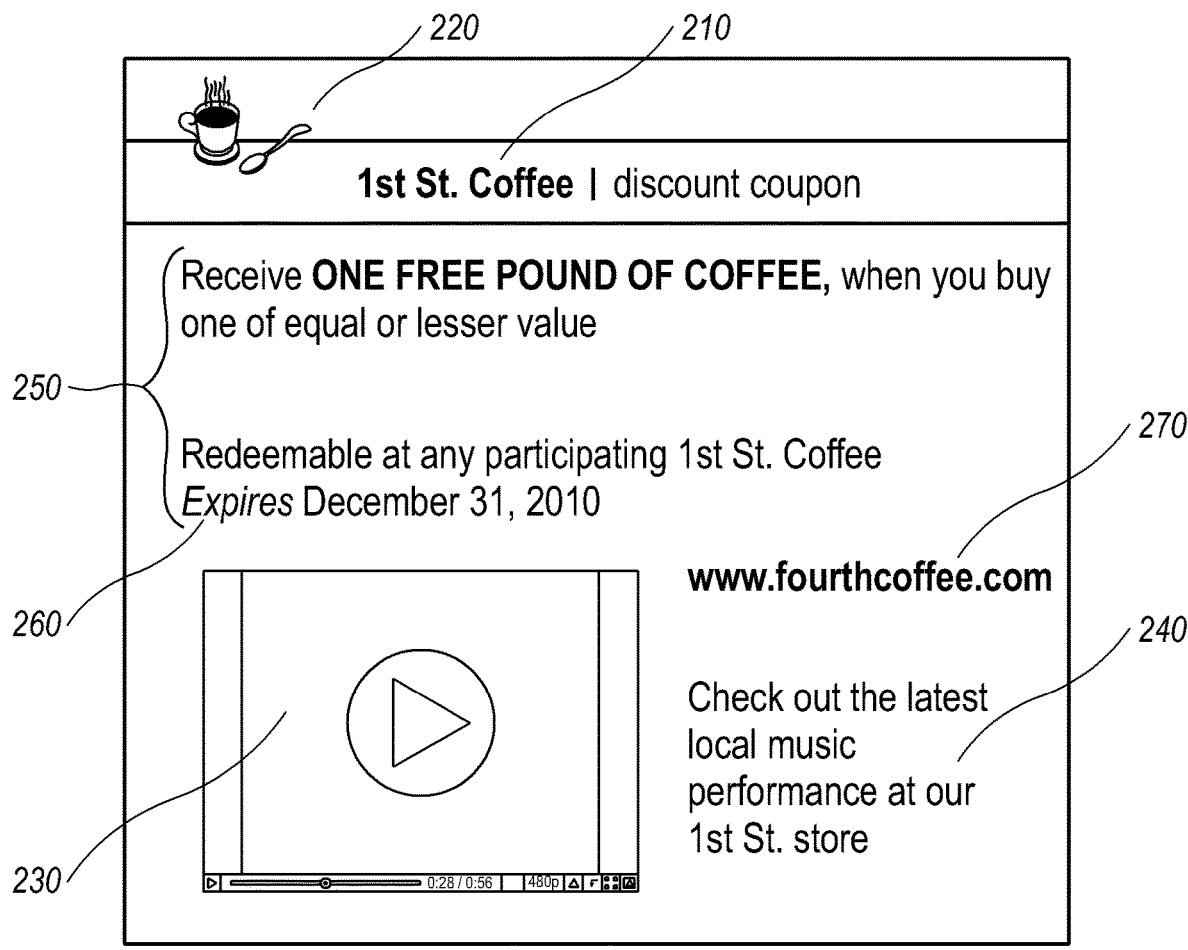
FIG. 2 illustrates an example online advertisement.

Referring to FIG. 2, an individual ad 200 can contain media as text 210, images 220, video 230, data 240, and metadata (not shown). Any of the media can contain information relevant to advertisement subject, terms of an offer 250 (including date of expiration) 260, and hyperlinks 270. For example, the text 210 describes the advertisement subject as "1$^{st}$ St. Coffee," the terms of the offer including "Receive ONE FREE POUND OsF COFFEE, when you buy one of equal or lesser value," with an expiration date of "Dec. 31, 2004." Using encoding such as extended-HTML (HyperText Markup Language) or XML (eXtensible Markup Language), the present technology can tag information such as date of expiration and terms. For example, the source code and Java® script of the ad of FIG. 2 can include "<expiration date>2004/12/31</expiration date>."

Figure 3:
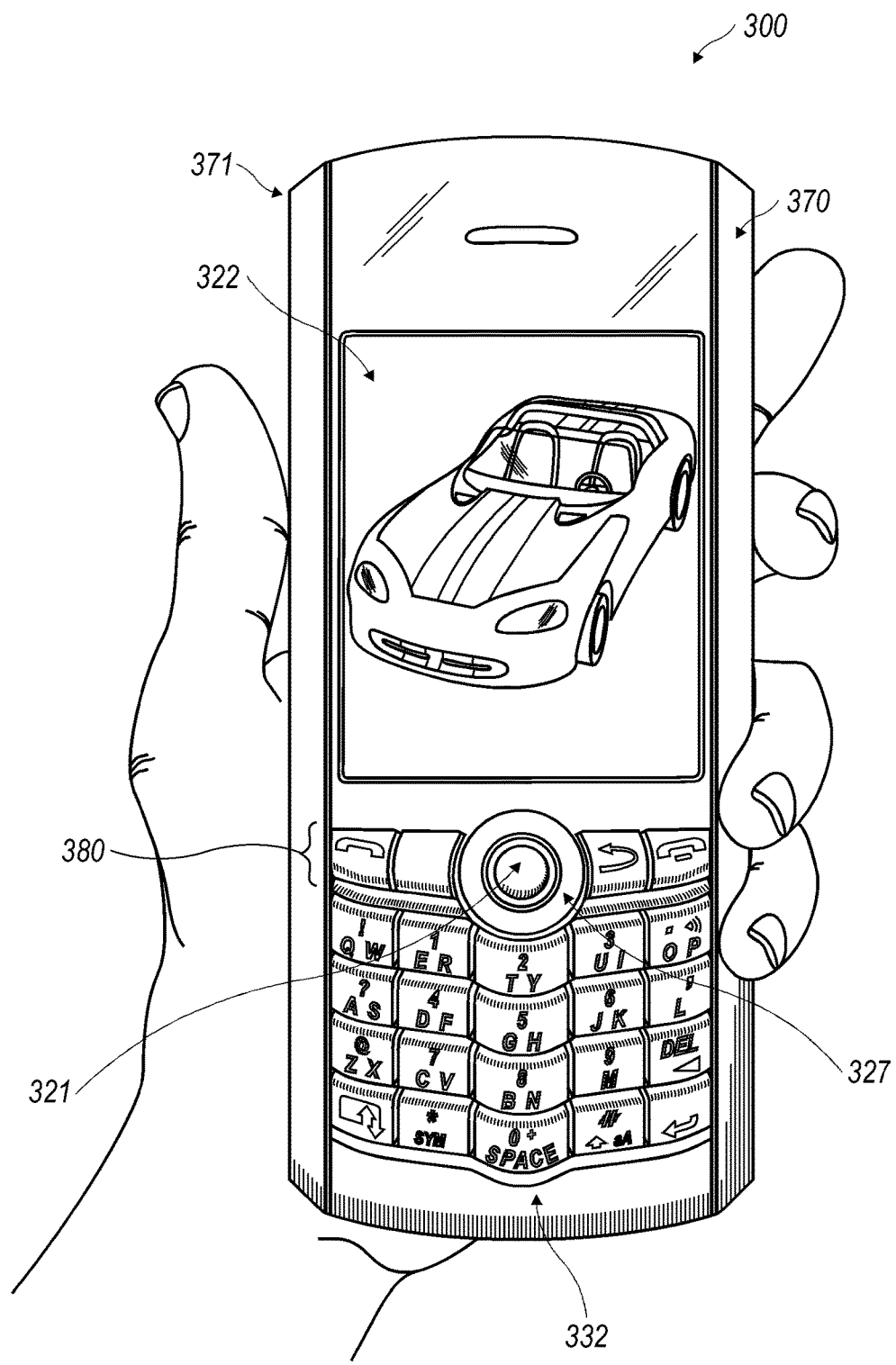
FIG. 3 illustrates an exemplary mobile communication device used in embodiments of the technology.

As may be appreciated from FIG. 3, an exemplary mobile communication device 300 (as an example of 103) comprises a display 322 located above a keyboard 332 constituting a user input means and suitable for accommodating textual input to the device 300. In some embodiments, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. Its front face location allows the tool to be thumb-actuable, e.g., like the keys of the keyboard 332. Some embodiments provide the navigation tool 327 in the form of a trackball 321 that may be utilized to instruct two-dimensional screen cursor movement in substantially any direction, as well as act as an actuator when the trackball 321 is depressed like a button. Other embodiments can provide the navigation tool in the form of a trackpad, a touchpad, a pointing stick, joystick, graphics tablet, or combinations thereof. The placement of the navigation tool 327 may be above the keyboard 332 and below the display screen 322; here, it may avoid interference during keyboarding and does not block the operator's view of the display screen 322 during use.

The device 300 may be configured to send and receive messages. The device 300 includes a body 371 that may, in some embodiments, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 4:
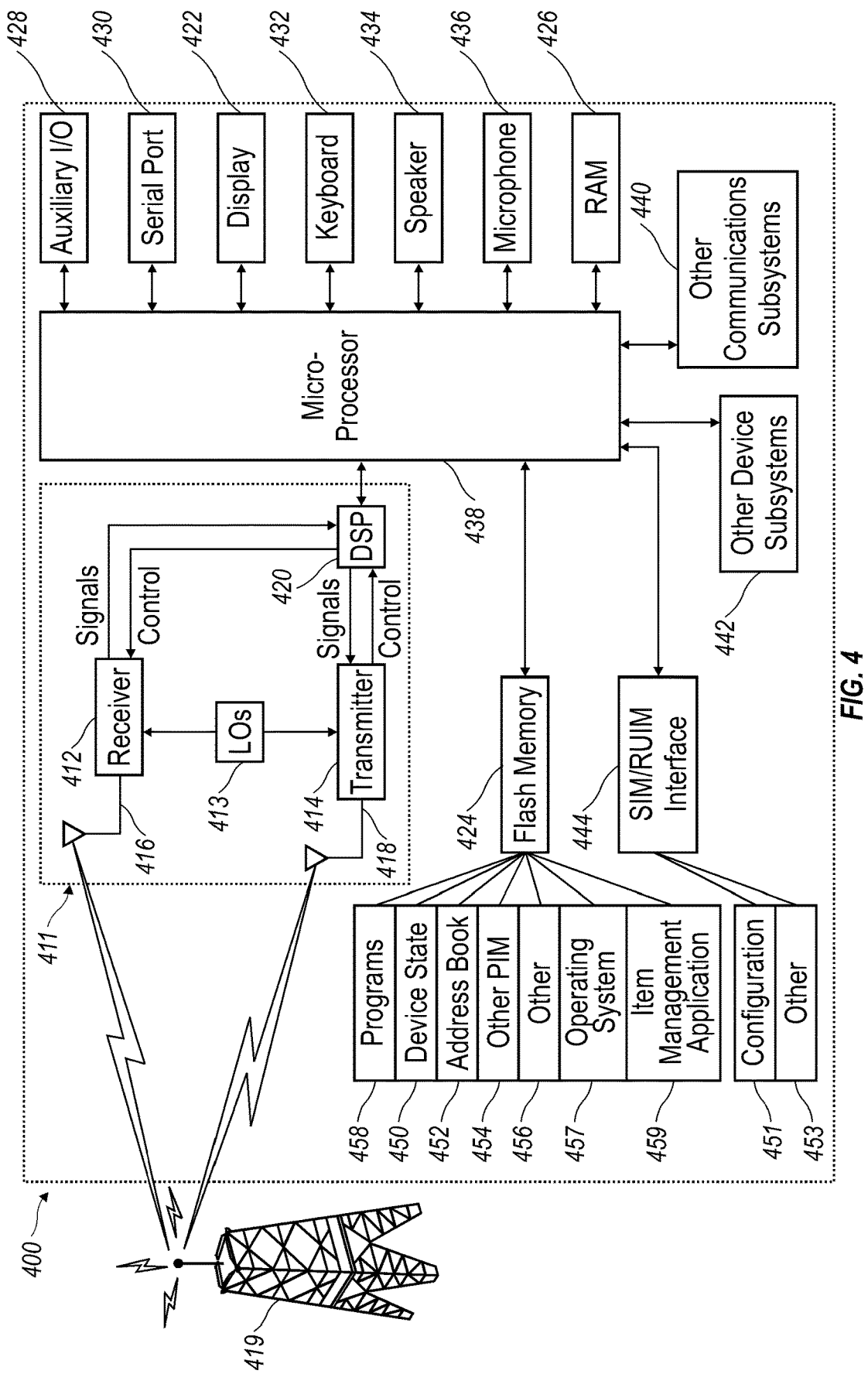
FIG. 4 illustrates a device, such as in FIG. 3, in detail.

Referring to FIG. 4, a block diagram of a communication device, such as 300 and 103, in accordance with an exemplary embodiment is illustrated. As shown, the device 400 includes a microprocessor 438 that controls the operation of the communication device 400. A communication subsystem 411 performs communication transmission and reception with the wireless network 419. The microprocessor 438 further can be communicatively coupled with an auxiliary input/output (I/O) subsystem 428 that can be communicatively coupled to the communication device 400. In at least one embodiment, the microprocessor 438 can be communicatively coupled to a serial port (for example, a Universal Serial Bus port) 430 that can allow for communication with other devices or systems via the serial port 430. A display 422 (e.g., 322) can be communicatively coupled to microprocessor 438 to allow for displaying of information to an operator of the communication device 400. When the communication device 400 is equipped with a keyboard 432 (e.g., 332), the keyboard can also be communicatively coupled with the microprocessor 438. The communication device 400 can include a speaker 434, a microphone 436, random access memory (RAM) 426, and flash memory 424 all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some embodiments not all of the above components may be included in the communication device 400. For example, in at least one embodiment the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321 as illustrated in the exemplary embodiment shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or they can be of a software nature, typically constituted by representations of physical keys on a display screen 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 422, which in one embodiment is enabled by touching the display screen 422, for example, with a stylus, finger, or other pointer, to generate the character or activate the indicated command or function. Some examples of display screens 422 capable of detecting a touch include resistive, capacitive, projected capacitive, infrared and surface acoustic wave (SAW) touch screens.

Physical and virtual keys can be combined in many different ways as appreciated by those skilled in the art. In one embodiment, physical and virtual keys are combined such that the plurality of enabled keys for a particular program or feature of the communication device 400 is shown on the display screen 422 in the same configuration as the physical keys. Using this configuration, the operator can select the appropriate physical key corresponding to what is shown on the display screen 422. Thus, the desired character, command or function is obtained by depressing the physical key corresponding to the character, command or function displayed at a corresponding position on the display screen 422, rather than touching the display screen 422.

Furthermore, the communication device, e.g. 400 is equipped with components to enable operation of various programs, as shown in FIG. 4. In an exemplary embodiment, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display screen 422. While in an exemplary embodiment the operating system 457 is stored in flash memory 424, the operating system 457 in other embodiments is stored in read-only memory (ROM) or similar storage element (not shown). As those skilled in the art will appreciate, the operating system 457, device program 458 or parts thereof may be loaded in RAM 426 or other volatile memory.

In some embodiments, the flash memory 424 may contain programs 458 for execution on the device 400, including— but not limited to—an address book 452, a personal information manager (PIM) 454, and a device state 450. Furthermore, programs 458 and other information 456 including data can be segregated upon storage in the flash memory 424 of the device 400.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 may be able to operate some features without a SIM/RUIM card, but it will not be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary embodiment are combined into a single antenna (not shown). As one skilled in the art would appreciate, the antenna or antennae (416, 418) in another embodiment can be externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary embodiment is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 103, 300, 400, for use in the technology can be characterized by an identification number assigned to the device. Such identification numbers cannot be changed and are locked to each device.

At times, a user may see an online advertisement of interest displayed on a device 103, but not have the time, or the desire, to follow up on the advertisement (or on an offer contained therein) immediately. Embodiments of the present technology enable re-serving of advertisements wherein the time to re-serve can be a function of at least ad content, such as an offer expiration date.

Embodiments of the technology can be implemented as programming across the architectural elements identified in FIG. 1, FIG. 3, and FIG. 4. In some embodiments, programming is implemented entirely on the mobile communications device 103. In some embodiments, programming for selection of ads to be re-served, and determination of re-serve conditions, are implemented on the mobile communications device 103, while ad storage is implemented on the wireless connector system 120 or a network server such as content server 134, messaging server 132, or application server 136. In some embodiments, ad storage can be implemented on an ad server, e.g., the original ad server. In embodiments where ads are stored off the mobile communications device, efficiencies can be obtained through strategies such as storing a unique ad once upon first selection so that the ad is available to each user of the enterprise that subsequently selects the ad for re-serve. Allocation of functionality among architectural elements can be a function of several factors including latency, processing resource availability and efficient usage, storage availability and efficient usage, and revenue opportunities.

Figure 5:
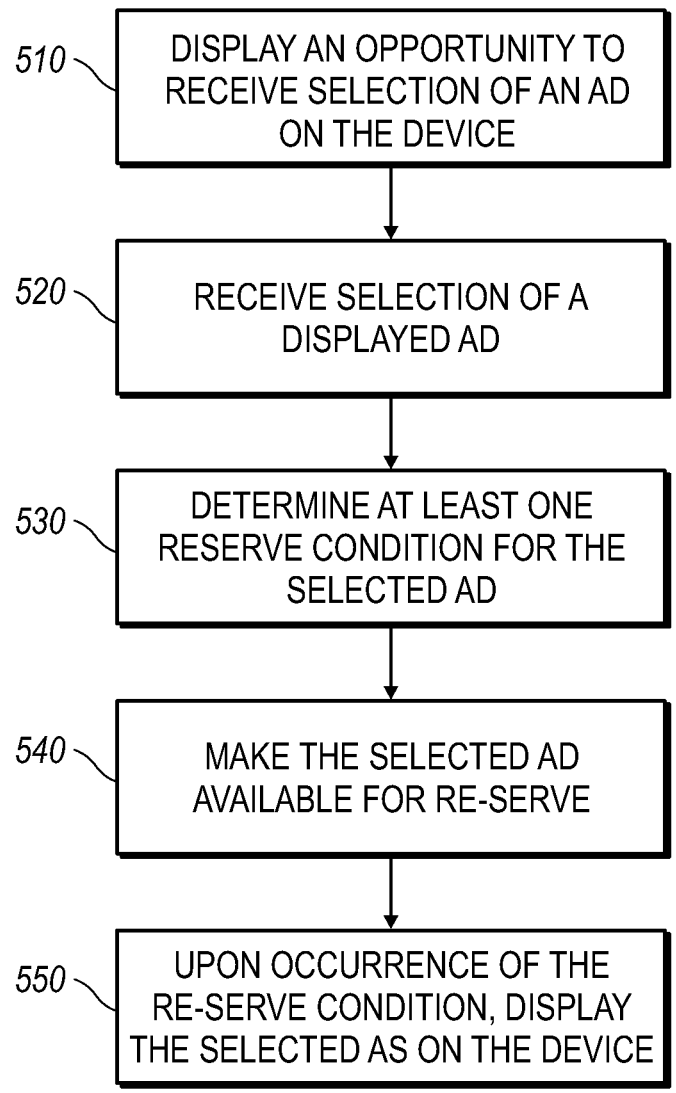
FIGS. 5 and 6 illustrates methods of the present technology.

Referring to FIG. 5, methods 500 of the technology are illustrated. The technology can present an opportunity to a user to select an ad to be re-served 510. The opportunity can be presented in various ways known to those of skill in the art for soliciting user input. For example, the technology can present a selection opportunity when a cursor is positioned over a displayed ad; when a cursor is positioned over an ad and a navigation device is activated (e.g., by pressing a trackball, by double-tapping a touchpad); when an ad is selected through tabbing and a menu button is depressed; and combinations thereof.

The technology can receive a selection of an ad to re-serve 520.

Upon selection, the technology can determine re-serve conditions for the ad 530. Re-serve conditions can be solicited from a user at the time of selection, can be based on predetermined criteria (e.g., set by a user or otherwise), determined from the content of the ad, and combinations thereof. A re-serve event can be a time or other circumstances. For example, serving an ad for a similar product, e.g., a car, can be a re-serve event for a selected car ad. For further example, receiving notice of an account balance above a price listed in the ad can be a re-serve event. A re-serve event can be determined from an offer expiration date contained in a selected ad, e.g., the ad of FIG. 2 contains an expiration date of "Dec. 31, 2004." A re-serve events for that ad can be one (1) week prior to Dec. 31, 2004, one (1) day prior to Dec. 31, 2004, and on Dec. 31, 2004.

Where one or more re-serve events are to be determined from the ad, the technology analyzes the ad for such reserve events, and can suggest such events to a user for selection as a re-serve event. For example, the technology can parse the source code of the ad of FIG. 2 to identify "<expiration date>December 31, 2004</expiration date>." The technology can then set the expiration date, or some time before the expiration date, as a re-serve event. The technology can present Dec. 31, 2004 and other earlier dates as potential re-serve dates and receive selection of one or more.

Embodiments of the technology make the ad available for re-serve 540. An ad can be made available for re-server in various ways depending on factors such as available processing resources, memory resources, latency restrictions, privacy concerns, and opportunity for revenue generation. For example, given sufficient memory and processing resources on the mobile device 103, a selected ad can be stored on the mobile device. As another example, the ad can be stored on the enterprise network 124 (e.g., in a content server 134). In some embodiments, a pointer for the ad is stored on the device 103 (or on the enterprise network 124) and the ad remains at the ad server, or at a server elsewhere on the Internet. Storing the ad on the device 103 offers greater privacy to a device user, while storing ads centrally on the enterprise network 124 or on the original server of the ad offers advantages in efficiency, since one copy of the ad can be stored for many users; and each user can access the stored ad for re-serve using a pointer stored on the mobile device 103.

Upon the occurrence of a re-serve event, embodiments of the technology re-serve the selected ad 550. In some embodiments, the technology presents an indication that the ad is a reserved ad. In some embodiments, the technology presents an indication of the re-serve event that prompted re-serve of the ad, e.g., "expiration date in <#days>."

Variations on the methods include re-determining re-serve events after a re-serve; informing the ad server that the ad was viewed, informing the ad server that the ad was selected for re-serve, and informing the ad server of the re-serve conditions. Informing an ad server of viewing, selection for re-serve, and re-server conditions can be of benefit to the advertiser as indications of interest in the goods or services that are the subject of the ad.

In some embodiments, management of ads by a user can be through an ad management console computer program. In such embodiments, the console can present a user with options to manage ads, e.g., create, view, edit, and save re-serve conditions of an ad and groups of ads; request an ad outside the re-serve loop.

Figure 6:
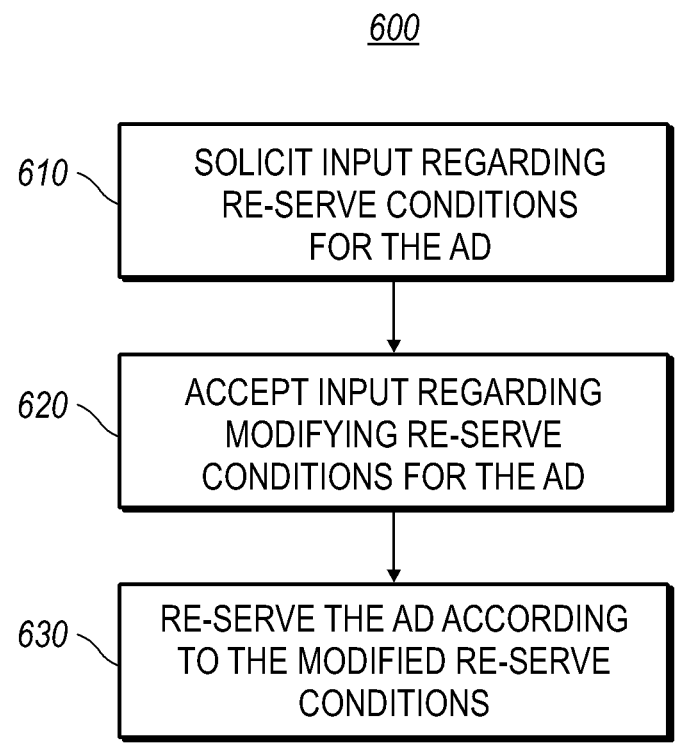

Referring to FIG. 6, further methods 600 of the technology are shown. Whether through an ad management console, or by other procedures (such as upon selecting an ad by right-clicking on the ad when it is displayed), the technology can solicit input regarding re-serve conditions for an ad 610. In those embodiments, the technology accepts 620 input that can modify, or even revoke, re-server condition for the ad. These embodiments then re-serve the ad according to the modified conditions 630.

In various embodiments of the technology, ads can pulled from an ad server by a device 103, pushed from an ad server to a device 103, or a combination of both. In some embodiments, an ad can be requested, e.g., by a user, outside of the re-serve loop. In various embodiments of the technology ads can be re-served in the application in which an ad was earlier served, in the ad management console, and in other applications that serve ads in a format compatible to the format in which the ad was earlier served (e.g., both having ads served.

The technology can take the forms of hardware, software or both hardware and software elements. In some embodiments, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

The invention claimed is:
1. A method for presenting content on a screen within a communication device, the method comprising:
 displaying, on the screen, an opportunity to receive selection of a displayed content item, wherein the displayed content item is an advertisement;

receiving, via a user interface, an input from a user selecting the displayed content item;

determining, in response to the input, a re-serve condition based on data within the displayed content item, wherein the re-serve condition is solicited from the user upon selection of the advertisement;

determining, a re-serve event based on the re-serve condition, wherein determining the re-serve event comprises electronically parsing source code of the displayed content item, and identifying the re-serve event based on the re-serve condition selection by the user and wherein the re-serve event is based on data embedded within the advertisement;

displaying, on the screen, the re-serve event;

determining an availability of resources of the communication device;

storing at least a portion of the displayed content item on the communication device when the resources satisfy a threshold; and storing at least a portion of the selected content item at a remote computing device when the resources fail to satisfy the threshold;

determining the re-serve event is satisfied without user intervention; and re-displaying, on the screen in response to determining the re-serve event is satisfied, the displayed content item without user intervention.

2. The method of claim 1, wherein determining the re-serve event comprises determining an expiration date of an offer in the displayed content item.

3. The method of claim 1, wherein storing at least the portion of the displayed content item on the communication device comprises storing the displayed content item in its entirety on the communication device.

4. The method of claim 1, wherein storing at least the portion of the selected content item at the remote computing device comprises storing the displayed content item in its entirety at the remote computing device; and storing a pointer to the remote computing device on the communication device.

5. A computer program product for presenting content on a screen within a communication device, the computer program product comprising instructions embodied on a non-transitory computer readable medium, wherein the instructions, when executed by a processor, cause the processor to:

display, on the screen, an opportunity to receive selection of a displayed content item, wherein the displayed content is an advertisement;

receive, via a user interface, an input from a user selecting the displayed content item;

determine, in response to the input, a re-serve condition based on data within the displayed content item, wherein the re-serve condition is solicited from the user upon selection of the advertisement;

determine, a re-serve event based on the re-serve condition, wherein determining the re-serve event comprises electronically parsing source code of the displayed content item, and identifying the re-serve event based on the re-serve condition selection by the user and wherein the re-serve event is based on data embedded within the advertisement;

display, on the screen, the re-serve event;

determine an availability of resources of the communication device;

store at least a portion of the displayed content item on the communication device when the resources satisfy a threshold; and store at least a portion of the displayed content item at a remote computing device when the resources fail to satisfy the threshold;

determine the re-serve event is satisfied without user intervention; and re-display, on the screen in response to determining the re-serve event is satisfied, the displayed content item without user intervention.

6. The computer program product of claim 5, wherein the instructions further cause the processor to determine an expiration date of an offer in the displayed content item as the re-serve event.

7. The computer program product of claim 5, wherein the displayed content item is stored in its entirety on the communication device when the resources satisfy the threshold.

8. The computer program product of claim 5, wherein the displayed content item is stored in its entirety at the remote computing device, and wherein the instructions further cause the processor to store a pointer to the remote computing device when the resources fail to satisfy the threshold.

9. A mobile communication device comprising:

a non-transitory computer readable medium configured to store instructions; and a processor in communication with the non-transitory computer readable medium and configured to execute the instruction to:

display, on a screen within the device, an opportunity to receive selection of a displayed content item, wherein the displayed content item is an advertisement;

receive, via a user interface, an input from a user selecting the displayed content item;

determine, in response to the input, a re-serve condition based, at least in part, on data within the displayed content item, wherein the re-serve condition is solicited from the user upon selection of the advertisement;

determine, a re-serve event based on the re-serve condition, wherein determining the re-serve event comprises electronically parsing source code of the displayed content item, and identifying the re-serve event based on the re-serve condition selection by the user and wherein the re-serve event is based on data embedded within the advertisement;

display, on the screen, the re-serve event;

determine an availability of resources of the communication device;

store at least a portion of the displayed content item on the communication device when the resources satisfy a threshold; and store at least a portion of the displayed content item at a remote computing device when the resources fail to satisfy the threshold;

determine the re-serve event is satisfied without user intervention; and re-display, on the screen in response to determining the re-serve event is satisfied, the displayed content item without user intervention.

10. The mobile communication device of claim 9, wherein the instructions further cause the processor to determine an expiration date of an offer in the selected content item as the re-serve event.

11. The mobile communication device of claim 9, wherein the displayed content item is stored in its entirety on the mobile communication device when the resources satisfy the threshold.

12. The mobile communication device of claim 9, wherein the displayed content item is stored in its entirety at the remote computing device, and wherein the instructions further cause the processor to store a pointer to the remote computing device when the resources fail to satisfy the threshold.

* * * * *